(12) United States Patent
Liu

(10) Patent No.: US 11,487,165 B2
(45) Date of Patent: Nov. 1, 2022

(54) DISPLAY PANEL AND DISPLAY DEVICE

(71) Applicant: HKC CORPORATION LIMITED, Shenzhen (CN)

(72) Inventor: Zhongnian Liu, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/312,018

(22) PCT Filed: Dec. 26, 2019

(86) PCT No.: PCT/CN2019/128692
§ 371 (c)(1),
(2) Date: Jun. 9, 2021

(87) PCT Pub. No.: WO2020/147548
PCT Pub. Date: Jul. 23, 2020

(65) Prior Publication Data
US 2022/0026751 A1    Jan. 27, 2022

(30) Foreign Application Priority Data
Jan. 18, 2019    (CN) .................. 201910046320.3

(51) Int. Cl.
G02F 1/1339    (2006.01)
G02F 1/133    (2006.01)
G02F 1/1333    (2006.01)
G02F 1/1335    (2006.01)
G02F 1/1362    (2006.01)

(52) U.S. Cl.
CPC ........ *G02F 1/1339* (2013.01); *G02F 1/13306* (2013.01); *G02F 1/133345* (2013.01); *G02F 1/133514* (2013.01); *G02F 1/136286* (2013.01); *G02F 2202/02* (2013.01)

(58) Field of Classification Search
CPC .......... G02F 1/13306; G02F 1/133345; G02F 1/133514; G02F 1/136286; G02F 2202/02; G02F 1/1339
See application file for complete search history.

(56) References Cited

U.S. PATENT DOCUMENTS

2011/0285944 A1*  11/2011  Park ...................... G02F 1/1345
                                            349/110
2016/0284782 A1    9/2016  Seo et al.
2017/0186996 A1    6/2017  Chen et al.

FOREIGN PATENT DOCUMENTS

CN    101303487 A    11/2008
CN    103293750 A    9/2013
CN    105679675 A    6/2016
(Continued)

OTHER PUBLICATIONS

Shixiong Liu, the ISA written comments, dated Mar. 2020, CN.
Shixiong Liu, the International Search Report, dated Mar. 2020, CN.

*Primary Examiner* — James A Dudek

(57) ABSTRACT

Disclosed are a display panel and a display device. The display panel includes: a first metal layer arranged on a substrate; a first insulating layer arranged on the first metal layer and the substrate; a second metal layer arranged on the first insulating layer; a second insulating layer arranged on the second metal layer and the first insulating layer, covering the first metal layer and the second metal layer; and a sealant arranged on the second insulating layer.

15 Claims, 7 Drawing Sheets

(56) References Cited

FOREIGN PATENT DOCUMENTS

| | | |
|---|---|---|
| CN | 107145016 A | 9/2017 |
| CN | 107579078 A | 1/2018 |
| CN | 108474985 A | 8/2018 |
| CN | 108762542 A | 11/2018 |
| CN | 108873460 A | 11/2018 |
| CN | 109633993 A | 4/2019 |
| JP | 2010032859 A | 2/2010 |

* cited by examiner

100 Display device

200 Display panel

DISPLAY PANEL AND DISPLAY DEVICE

CROSS REFERENCE OF RELATED APPLICATIONS

This application claims priority to and benefit of Chinese Patent Application Number CN201910046320.3, entitled "DISPLAY PANEL AND DISPLAY DEVICE", and filed Jan. 18, 2019 with China National Intellectual Property Administration, the entirety of which is hereby incorporated herein by reference.

TECHNICAL FIELD

This application relates to the field of display technology, and in particular to a display panel and a display device.

BACKGROUND

The statements herein are intended for the mere purpose of providing background information related to the present application but don't necessarily constitute the prior art.

Liquid Crystal Displays (LCDs) have advantages of low power consumption, wide color gamut, and large viewing angle, and are the most prevailing types of displays on the market. A liquid crystal display panel mainly includes an array substrate (Thin Film Transistor, TFT), a color film substrate (Color filter, CF), and a liquid crystal layer sandwiched between the two substrates. In the cell-assembly (Cell) process, a sealant is applied around the two substrates and a liquid crystal layer is injected within the sealant, before the sealant is cured to obtain a liquid crystal display panel structure. The TFT substrate charges and discharges the pixels to control the rotation of the liquid crystals, thereby realizing different display images.

However, during the process of applying the sealant, the sealant may not be able to fully stick to the surface of the substrate, so that the external air may easily enter the liquid crystal layer, corroding the circuits or giving rise to bubbles.

SUMMARY

In view of the above, it is an object of this application to provide a display panel and a display device, which facilitates the attachment of the sealant.

In order to achieve the above objective, the present application discloses a display panel, which includes a substrate, a first metal layer, a first insulating layer, a second metal layer, a second insulating layer, and a sealant. The substrate is divided into a display area and a non-display area that surrounds the display area. The first metal layer is disposed on the substrate and located in the non-display area. The first insulating layer is disposed on the first metal layer and the substrate. The second metal layer is disposed on the first insulating layer and is located in the non-display area. The second metal layer is disposed on the first insulating layer and is located in the non-display area. The second insulating layer is disposed on the second metal layer and the first insulating layer, covering the first metal layer and the second metal layer. The sealant is disposed on the second insulating layer, corresponding to the first metal layer and the second metal layer, where the first metal layer and the second metal layer are misaligned in seen from a direction perpendicular to the substrate.

The present application further discloses a display panel that includes a substrate, a first metal layer, a first insulating layer, a second metal layer, a second insulating layer, a sealant, a plurality of first driving circuits and a plurality of second driving circuits. The substrate is divided into a display area and a non-display area that surrounds the display area. The first metal layer is disposed on the substrate, and located in the non-display area. The first insulating layer is disposed on the first metal layer and the substrate. The second metal layer is disposed on the first insulating layer, and located in the non-display area. The second insulating layer is disposed on the second metal layer and the first insulating layer, covering the first metal layer and the second metal layer. The sealant is disposed on the second insulating layer. The plurality of first driving circuits are configured to drive scan lines arranged in the display area. And the plurality of second driving circuits are configured to drive data lines arranged in the display area. The first metal layer and the second metal layer are arranged in the same orientation. The first metal layer and the second metal layer are coupled to two adjacent ones of the plurality of first driving circuits, or are coupled to two adjacent ones of the plurality of second driving circuits. The first metal layer includes a plurality of first metal lines, and the second metal layer includes a plurality of second metal lines. The projections of the first metal line and the second metal line that are arranged in the same orientation in the direction perpendicular to the substrate do not overlap. Every two adjacent first metal line and second metal line that are arranged in the same orientation have the same projection pitch in the direction perpendicular to the substrate. The projection of the sealant in the direction perpendicular to the substrate at least partially overlaps with the projections of the first metal lines and the second metal lines in the direction perpendicular to the substrate.

The first metal lines include a plurality of first metal first lines and a plurality of first metal second lines, and the second metal lines include a plurality of second metal first lines and a plurality of second metal second lines. The plurality of first metal first lines and the plurality of second metal first lines are arranged in the same orientation. The plurality of first metal second lines and the plurality of second metal second lines are arranged in the same orientation. The plurality of first metal first lines are arranged in a different orientation than the plurality of first metal second lines. The projections of the plurality of first metal first lines in the direction perpendicular to the substrate do not overlap with the projections of the plurality of second metal first lines in the direction perpendicular to the substrate. The projections of the plurality of first metal second lines in the direction perpendicular to the substrate do not overlap with the projections of the plurality of second metal second lines in the direction perpendicular to the substrate. The plurality of first metal first lines are vertically arranged relative to the plurality of first metal second lines seen from a direction perpendicular to the substrate. The plurality of second metal second lines are vertically arranged relative to the plurality of second metal second lines seen from a direction perpendicular to the substrate. The upper surface of at least a part of the second insulating layer located on the first metal layer has a same height as that of the upper surface of at least a part the second insulating layer located on the second metal layer.

The present application further discloses a display device that includes a display panel. The display panel includes a substrate, a first metal layer, a first insulating layer, a second metal layer, a second insulating layer, and a sealant. The substrate is divided into a display area and a non-display area that surrounds the display area. The first metal layer is disposed on the substrate and located in the non-display area. The first insulating layer is disposed on the first metal layer and the substrate. The second metal layer is disposed on the first insulating layer and is located in the non-display area. The second metal layer is disposed on the first insulating layer and is located in the non-display area. The second insulating layer is disposed on the second metal layer and the first insulating layer, covering the first metal layer and the second metal layer. The sealant is disposed on the second insulating layer, corresponding to the first metal layer and the second metal layer, where the first metal layer and the second metal layer are misaligned in seen from a direction perpendicular to the substrate.

In contrast with the scheme where the first metal layer and the second metal layer totally coincide seen from the direction perpendicular to the substrate, they are misaligned in the direction perpendicular to the substrate in the present application. Because the second insulating layer covers the first metal layer and the second metal layer, and the sealant is arranged on the second insulating layer and corresponds to the first metal layer and the second metal layer, the level difference of the surface of the second insulating layer at the portions corresponding to the metal layers in the direction perpendicular to the substrate is reduced, making the surface of the second insulating layer flatter. Accordingly, these portions of the second insulating layer in contact with the sealant would have an even lower slope, thus providing a greater supporting force to the sealant, making the sealant better adhere to the second insulating layer, reducing the gap between the sealant and the second insulating layer, thereby reducing the chances of external air or water vapor from passing through the sealant and entering the display panel, preventing the formation of bubbles or corrosion of components within the substrates.

BRIEF DESCRIPTION OF DRAWINGS

The drawings included herein are intended to provide a further understanding of the embodiments of the present application. They constitute a part of the specification, and are used to illustrate the embodiments of the present application, and explain the principle of the present application in conjunction with the specification. Apparently, the drawings in the following description merely represent some embodiments of the present disclosure, and for those having ordinary skill in the art, other drawings may also be obtained based on these drawings without investing creative efforts. A brief description of the drawings is provided as follows.

DETAILED DESCRIPTION OF EMBODIMENTS

Figure 1:
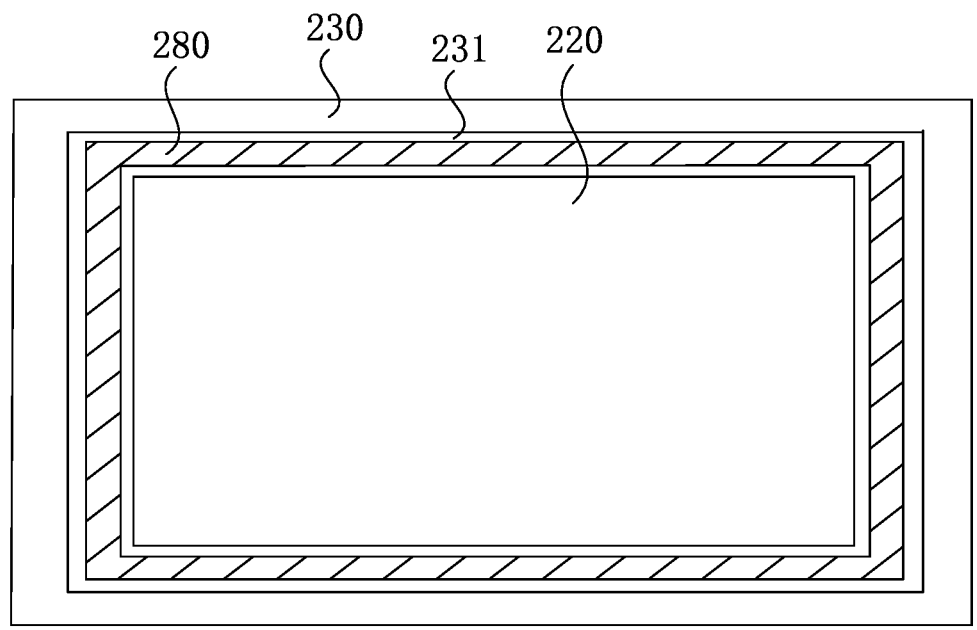
FIG. 1 is a schematic top view of an example display panel according to the present application.

The specific structures and functional details disclosed herein are merely representative and are used for the purpose of describing some illustrative embodiments of the present application. However, this application may be implemented in many alternative forms and thus is not to be construed as being limited only to the embodiments set forth herein.

As used herein, the terms "center", "lateral", "up", "down", "left", "right", "vertical", "horizontal", "top", "bottom", "inside", "outside", and the like are used to indicate orientational or positional relationships based on those illustrated in the drawings. They are merely intended for the convenience of illustrating the present disclosure and simplifying the description, rather than indicating or implying that the device or element referred to must have a particular orientation or be constructed and operate in a particular orientation. Therefore, these terms should not be construed as restricting the present disclosure. In addition, terms like "first", "second", etc. are merely used for illustrative purposes, and shall not be construed as indicating or implying relative importance or implicitly indicating the number of specified technical features. Thus, the features defined by "first" and "second" may explicitly or implicitly include one or more of the features. As used herein, the terms "a plurality" and "multiple" mean two or more, unless specifically defined otherwise. In addition, terms 'comprising", "including", and any variations thereof are intended to encompass a non-exclusive inclusion.

As used herein, terms "installed on", "connected to", "connected with", "coupled to", and "coupled with" should be understood in a broad sense unless otherwise specified and defined. For example, they may indicate a fixed connection, or a detachable connection, or an integral connection. They may be a mechanical connection and may also be an electrical connection or coupling. They may denote a direct connection, or may be a connection through an intermediate, or may be an internal communication between two elements. For those having ordinary skill in the art, the specific meanings of the above terms as used in the present application can be understood on a case-by-case basis.

The terminology used here is intended for the mere purpose of describing specific embodiments and is not intended to limit the present disclosure to the exemplary embodiments. Unless the context clearly dictates otherwise, the singular forms "a" and "one" used herein are intended to include the plural. It is also to be understood that the terms "including" and/or "comprising" used herein indicate the existence of specified features, integers, steps, operations, units, and/or components, and do not exclude the existence or addition of one or more other features, integers, steps, operations, units, components, and/or combinations thereof.

In the drawings, similar structures are indicated by the same reference numerals.

The application will be further described below with reference to the drawings and optional embodiments.

Figure 2:
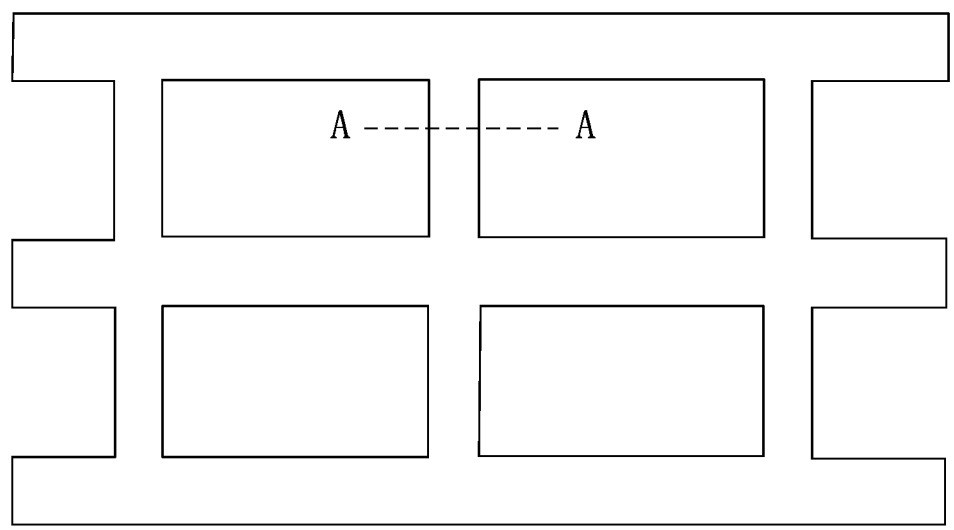
FIG. 2 is a schematic top view of an example first metal layer and second metal layer according to the present application.
Figure 3:
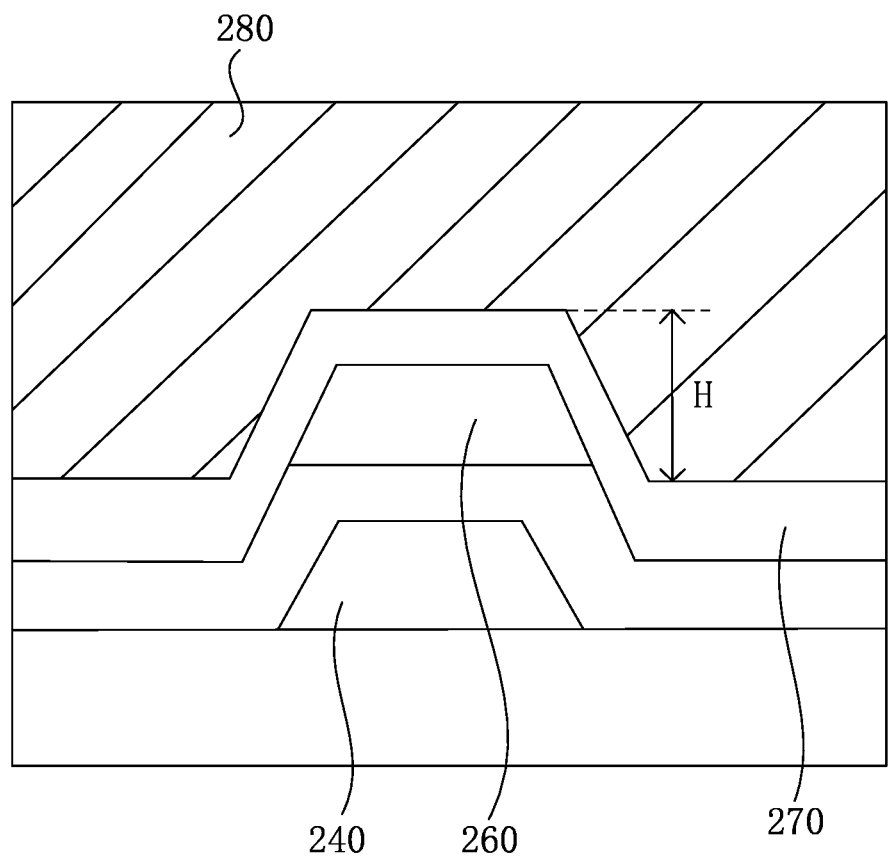
FIG. 3 is a schematic partial cross-sectional view of an example first metal layer and second metal layer taken along line A-A according to the present application.

The liquid crystal layer is sealed within the substrates using a sealant to prevent leakage. Generally, for a liquid crystal panel, air or water vapor should be prevented from entering the liquid crystal layer, otherwise it is easy to form bubbles in the display panel, or cause corrosion of the circuits on the array substrate side thus causing abnormal display of the screen. When the sealant is coated onto the uneven surface of the substrate, the sealant will not be able to fully adhere to the surface of the substrate, so that there will be certain slits at the positions where the sealant and the substrate are fitted, making it easy for the external air to enter the liquid crystal layer along the gap between the sealant and the surface of the substrate. FIGS. 1 to 3 show an exemplary display panel that has not been disclosed, the display panel including a display area 220 and a non-display area 230. The non-display area 230 is provided with a peripheral wiring 231 and a sealant 280. The peripheral wiring 231 and the sealant 280 partially overlap. The peripheral wiring 231 includes a first metal layer 240 and a second metal layer 260, which are stacked one over the other. The surface of the second insulating layer 270 has a relatively high level difference H, and so the sealant 280 and the second insulating layer 270 may not have a desirable bonding effect at the portion of the surface having the level difference H, thus easily giving rise to slits.

The application will be further described below with reference to the drawings and optional embodiments.

As illustrated in FIGS. 4 to 10, embodiments of the present application disclose a display panel, which includes a substrate 210, a first metal layer 240, a first insulating layer 250, a second metal layer 260, a second insulating layer 270, and sealant 280. The substrate 210 is divided into a display area 220 and a non-display area 230, where the display area 220 is configured as a display screen, and the non-display area 230 is arranged to surround the display area 220. The first metal layer 240 is disposed on the substrate 210 and is located in the non-display area 230. The first insulating layer 250 is disposed on the first metal layer 240 and the substrate 210. The second metal layer 260 is disposed on the first insulating layer 250 and is located in the non-display area 230. The second insulating layer 270 is disposed on the second metal layer 260 and the first insulating layer 250, covering the first metal layer 240 and the second metal layer 260. The sealant 280 is disposed on the second insulating layer 270 and corresponds to the first metal layer 240 and the second metal layer 260. The first metal layer 240 and the second metal layer 260 are misaligned seen from a direction perpendicular to the substrate 210.

In particular, the first metal layer 240 and the second metal layer 260 are misaligned seen from the direction perpendicular to the substrate 210. Because the second insulating layer 270 covers the first metal layer 240 and the second metal layer 260, and the sealant 280 is arranged on the second insulating layer 270 and corresponds to the first metal layer 240 and the second metal layer 260, the misalignment can reduce the level difference of the portion of the surface of the second insulating layer 270 corresponding to the metal layer measured in the direction perpendicular to the substrate 210, thus making the surface of the second insulating layer 270 flatter. As such, this portion of the second insulating layer 270 in contact with the sealant 280 would have a lower slope, and so will be able to provide a greater supporting force to the sealant 280, making the sealant 280 better adhere to the second insulating layer 270. This would reduce the gap between the sealant 280 and the second insulating layer 270, thereby reducing the chances of the external air or water vapor passing through the sealant 280 and getting into the display panel, and preventing the formation of bubbles or corrosion of components in the substrate 210.

The first metal layer 240 includes a plurality of first metal lines 241. The second metal layer 260 includes a plurality of second metal lines 261. The projection of the first metal line 241 in the direction perpendicular to the substrate and the projection of the second metal line 261 in the direction perpendicular to the substrate that are arranged in the same orientation. In other words, the first metal lines 241 and the second metal lines 261 each include wires that are arranged in different orientations. However, as long as a first metal line 241 and a second metal line 261 are arranged in the same orientation, they will not overlap seen from the direction perpendicular to the substrate. The projection of the sealant 280 along the direction perpendicular to the substrate at least partially overlaps the projections of the first metal lines 241 and the second metal lines 261 in the direction perpendicular to the substrate.

The display panel includes an array substrate 210 and a color filter substrate 210 that are oppositely arranged. The first metal layer 240 and the second metal layer 260 are disposed in the non-display area 230 of the array substrate 210. The sealant 280 is disposed on the first metal lines 241 and the second metal lines 261 and surrounds the display area 220 thus sealing the array substrate 210 and the color filter substrate 210. Typically, after the sealant 280 is applied, the sealant 280 needs to be cured by ultraviolet light, which is typically irradiated from the side of the array substrate 210. Because of the fact that the first metal layer 240 and the second metal layer 260 have the capability of shielding light thus making it difficult for light to pass through the first metal layer 240 or the second metal layer 260, the first metal layer 240 and the second metal layer 260 may be hollowed out to form a plurality of first metal lines 241 and a plurality of second metal lines 261, thereby allowing light to pass through the gap between the first and second metal lines 261. The projections of the first metal line 241 and the second metal line 261 that are arranged in the same orientation along the direction perpendicular to the substrate do not overlap, namely the first metal line 241 and the second metal line 261 that are arranged in the same orientation are misaligned. Because the second insulating layer 270 covers the first metal layer 240 and the second metal layer 260, the reduction of the level difference H on the surface of the second insulating layer 270 measured along the direction perpendicular to the substrate would make the surface of the second insulating layer 270 flatter, facilitating the sealant 280 to be better bonded to the second insulating layer 270. This thus reduces the gap between the sealant 280 and the second insulating layer 270, thereby reducing the chances for the external air or water vapor passing through the sealant 280 and getting inside the display panel, preventing bubbles from being formed within the substrates 210 or the components within the substrates 210 from being corroded.

The materials of the sealant 280 may be prepared by epoxy resin, a curing agent, a filler, and other additives. The sealant 280 has certain fluidity before being cured by UV (ultraviolet). But unlike general fluids such as water, sealant 280 has a certain viscosity. Accordingly, if the sealant 280 is coated on a surface with a relatively high level difference H, the part of sealant 280 at the position of the level difference H will not be able to overcome its own viscosity by its own gravity and so may partially stop at the side wall at the position of level difference H and cannot flow downward. In contrast, the surface with a relatively low level difference H may also have a relatively low gradient, and so pressure of the sealant 280 on the surface at the position of the level difference H will also increase, facilitating the sealant 280 to continue flowing downward, thereby reducing the gap between the sealant 280 and the second insulating layer 270. The projections of the first metal layer 240 and the second metal layer 260 in the horizontal plane do not overlap. The first metal layer 240 and the second metal layer 260 are two layers of metal. Ends of the first metal layer 240 and the second metal layer 260 are coupled together by via holes.

Figure 4:
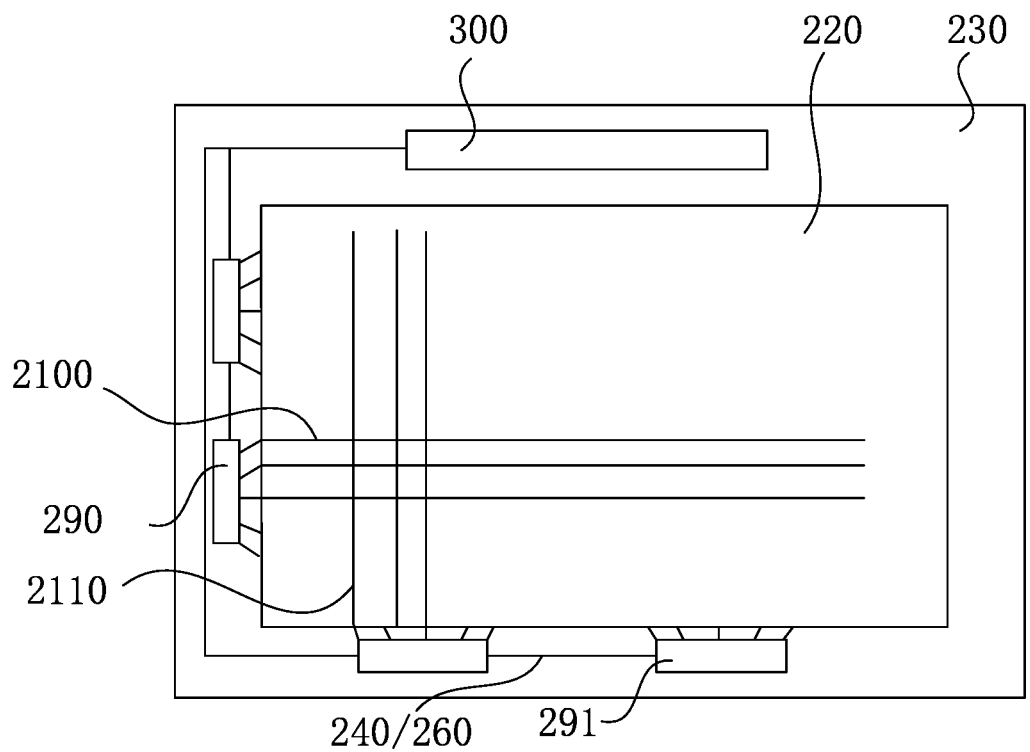
FIG. 4 is a schematic top view of a display panel according to an embodiment of the present application.

As illustrated in FIG. 4, the data lines 2110 and the scan lines 2100 are disposed in the display area 220. The first metal layer 240, the second metal layer 260, the first driving circuits 290, the second driving circuits 291, and the timing controller 300 are disposed in the non-display area 230. The plurality of first driving circuits 290 are configured to drive the scan lines 2100. The plurality of second driving circuits 291 are configured to drive the data lines 2110. The first metal layer 240 and the second metal layer 260 are coupled to two adjacent first driving circuits 290, or are coupled to two adjacent second driving circuits 291.

The first metal layer 240 and the second metal layer 260 may also individually be coupled to the timing controller 300, the first driving circuits 290, and the second driving circuit 291, to transmit signals to the timing controller 300, or coupled to the adjacent first driving circuit 290 and the adjacent second driving circuit 291 to transmit signals. The first metal layer 240 and the second metal layer 260 are of the same kind of wiring, and the distribution of the two metal layers indirectly increases the cross-sectional area of the current passing path thus reducing the resistance of the wiring.

Figure 5:
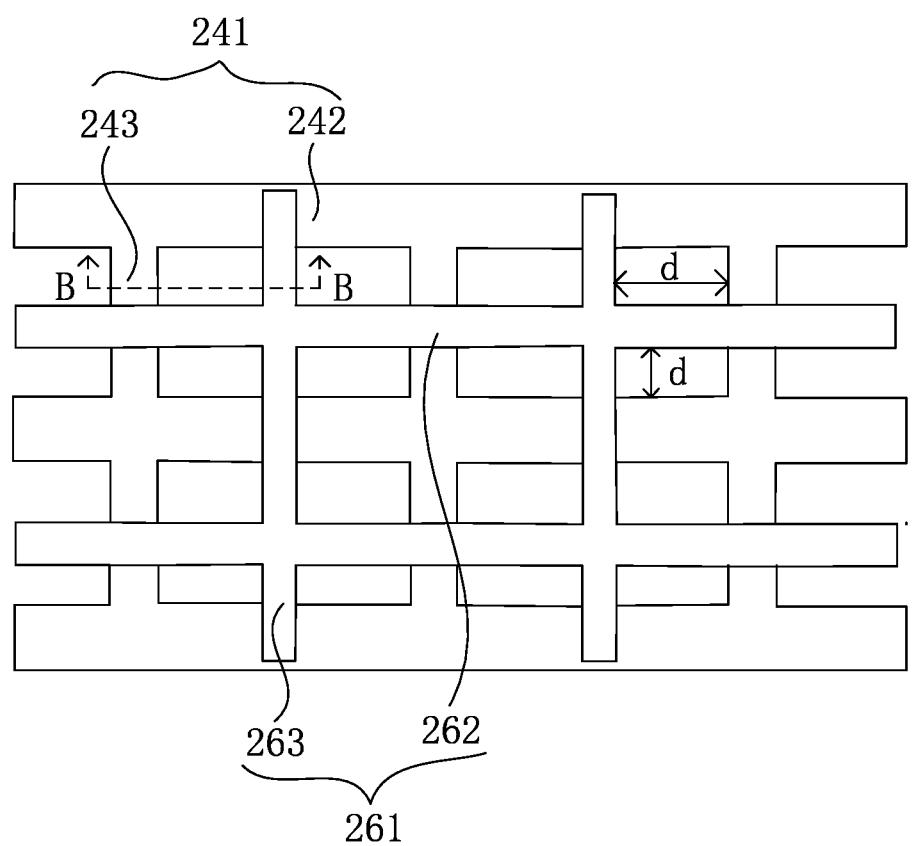
FIG. 5 is a schematic top view of a first metal layer and a second metal layer according to another embodiment of the present application.
Figure 6:
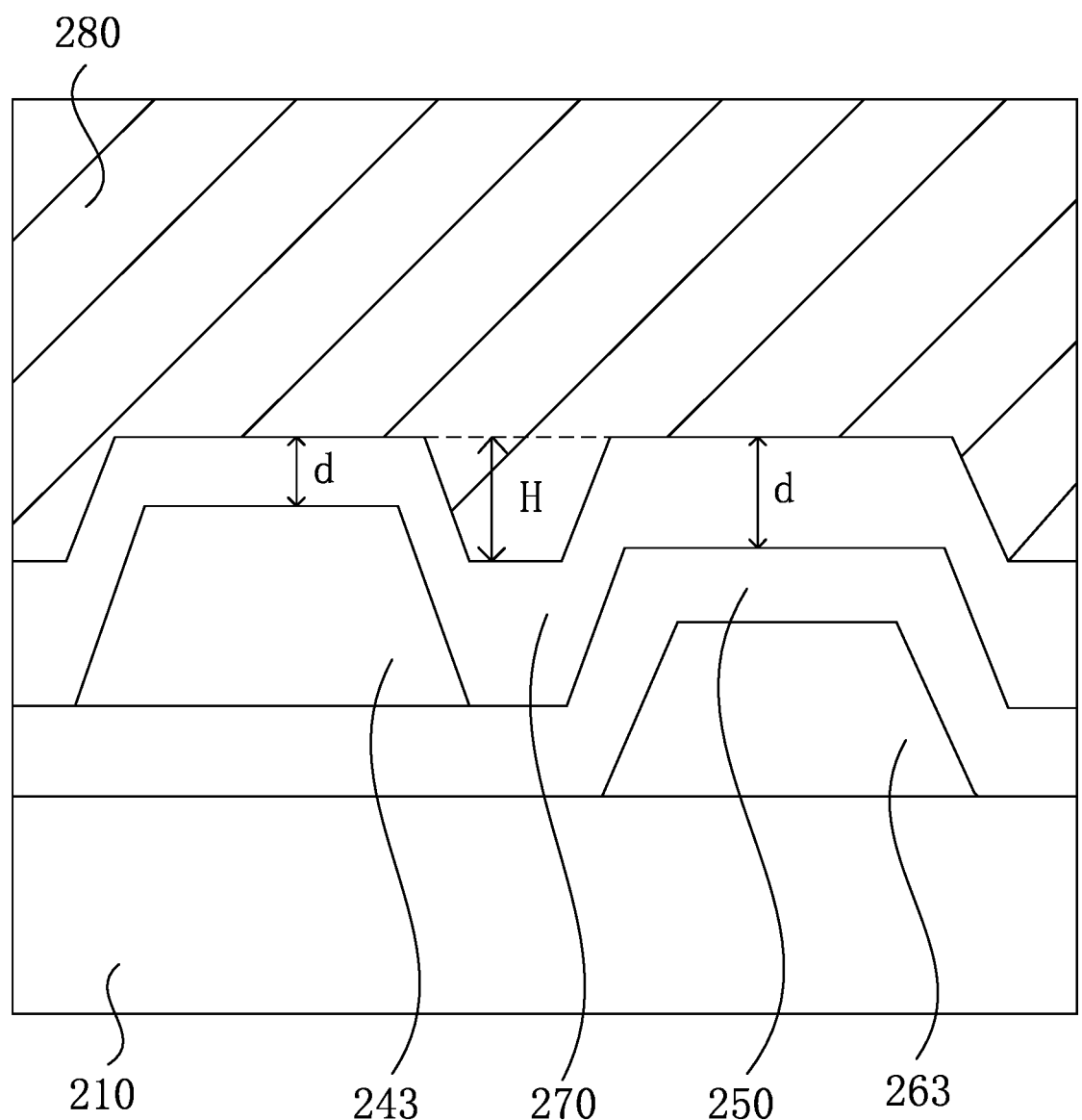
FIG. 6 is a schematic partial cross-sectional view of a first metal layer and a second metal layer taken along line B-B according to another embodiment of the present application.

As illustrated in FIGS. 5 and 6, the second metal lines 261 are above the first metal lines 241, which are misaligned seen from the direction perpendicular to the substrate. The first metal lines 241 include a plurality of first metal first lines 242 and a plurality of first metal second lines 243. The second metal lines 261 include a plurality of second metal first lines 262 and a plurality of second metal second lines 263. The plurality of first metal first lines 242 are arranged in the same orientation as the plurality of second metal first lines 262. The plurality of first metal second lines 243 are arranged in the same orientation as the plurality of second metal second lines 263. The plurality of first metal first lines 242 are not arranged in the same orientation as the plurality of first metal second lines 263.

The first metal first lines 262 are arranged in the same orientation as the coating orientation of the sealant 280. The direction of current of the first metal layer 240 and the second metal layer 260 is consistent with the orientation in which the first metal first lines 242 are arranged. The wiring arrangement of the first metal lines 241 and the second metal lines 261 in various orientations forms a mesh-shaped hollow area, thus facilitating the ultraviolet light in passing through the first metal layer 240 and the second metal layer 260 to cure the sealant 280, thereby improving the curing time and curing effect of the sealant 280. In addition, the wiring arranged in an inconsistent orientation compared to the direction of the current can prevent a local disconnection of the first metal line 241 or the second metal line 261 from causing inability to transmit signals or increasing resistance. For example, the first metal first line 242 may be disconnected between two first metal second lines 243. In this case, normally because the first metal first line 242 is opened, no current will flow through, so that the first metal first line 242 will not be able to transmit signals and the resistance of the first metal layer 240 would increase thus resulting in an increased power consumption. However, by providing multiple wires that are arranged in the same orientation as the direction of the current, the current flowing through the first metal first line 242 will be able to be transmitted to another adjacent first metal first line through the first metal second line 243 near the break point, and the current may flow through the next first metal second line 243 before flowing again to the earlier first metal first line 242 that had a break point, thereby providing multiple layers of guarantees for the circuits.

The first metal second lines 243 and the second metal second lines 263 are arranged in an orientation perpendicular to that of the first metal first lines 242 and the second metal first lines 262. Both the first metal second lines 243 and the second metal second lines 263 are designed to connect together the lines that are arranged in the same orientation as the direction of the current, providing multiple layers of protection for line failures of the first metal layer 240 and the second metal layer 260. The shorter the length of the first metal second lines 243 and the second metal second lines 263, the better, which on one aspect may reduce the resistance acted on the current flowing through, on another aspect may also reduce the occupied space thus increasing the hollow area of the first metal layer 240 and the second metal layer 260, hence an increased curing speed of the sealant 280, and on yet another aspect may provide a greater tensile strength for the first metal layer 240 and the second metal layer 260 to prevent dislocation and disconnection.

As illustrated in FIG. 6, the height d of the upper surface of at least a part of the second insulating layer 270 located on the first metal layer is equal to the height d of the upper surface of at least a part of the second insulating layer 270 located on the second metal layer. Because the first metal layer and the second metal layer are alternately arranged, the height of the first metal layer measured in the direction perpendicular to the substrate may not be the same as the height of the second metal layer measured in the direction perpendicular to the substrate. Thus, there is a need to ensure that the portions of the second insulating layer 270 covering them have the same height d, so that the contact surface to be coated with the sealant 280 will become flatter, thus facilitating a closer contact between the sealant 280 and the second insulating layer 270.

In an embodiment, the projections of the plurality of first metal first lines 242 in the direction perpendicular to the substrate do not overlap the projections of the plurality of second metal first lines 263 in the direction perpendicular to the substrate. The projections of the plurality of first metal second lines 243 in the direction perpendicular to the substrate do not overlap the projections of the plurality of second metal second lines 263 in the direction perpendicular to the substrate.

The second insulating layer 270 is disposed on the second metal lines 261 and the first insulating layer 250, covering the first metal lines 241 and the second metal lines 261. Both the first metal lines 241 and the second metal lines 261 have a certain thickness, and so it is desirable to avoid overlapping between the first metal lines 241 and the second metal lines 261 in order that the second insulating layer 270 covering the first metal lines 241 and the second metal lines 261 will become flatter. Accordingly, the positions where the sealant 280 and the second insulating layer 270 are in contact would be relatively flatter, improving the adhering capability of the sealant 280 so that the sealant 280 can be better attached to the second insulating layer 270, thereby reducing the gap between the sealant 280 and the second insulating layer 270 and improving the sealing performance of the substrates 210.

As illustrated in FIG. 5, the interval d denotes the distance between adjacent wires that arranged in the same orientation seen from the direction perpendicular to the substrate. The intervals d between the first metal line 241 and the two adjacent second metal lines 261 that are arranged in the same orientation may be equal to each other.

That is, the projections of a first metal line 241 and adjacent second metal lines 261 that are arranged in the same orientation along the direction perpendicular to the substrate are positioned at equal intervals d, thus ensuring that each hollow area between the first metal lines 241 and the second metal lines 261 has an equal size. Accordingly, the area through which the ultraviolet light is transmitted through each hollow area is the same, so that the overall curing speed of the sealant 280 may be more uniform, thereby reducing the curing time for the ultraviolet light. Of course, unequal intervals are also possible. Optionally, the intervals of the projections of the first metal line 241 and the adjacent second metal lines 261 that are arranged in the same orientation along the direction perpendicular to the substrate may be greater than or equal to 3 microns.

The first metal lines 241 and the second metal lines 261 are both formed by etching the first metal layer 240 and the second metal layer 260. Before etching, it is needed to expose and develop the photoresist provided on the first metal layer 240 and the second metal layer 260 to form the required pattern, and then etch the metal layer outside of the pattern to form the required first metal lines 241 and Two metal lines 261. Due to the limitations of the displacement accuracy and exposure accuracy of the platform of the exposure machine, the intervals of the projections between the first metal line 241 and the adjacent second metal lines 261 that are arranged in the same orientation along the direction perpendicular to the substrate cannot be equal to zero. Because if there are no intervals, there will be insufficient exposure accuracy resulting in a certain overlap between the adjacent first metal line 241 and second metal lines 261, so that the portion of the second insulating layer 270 at the overlap will have a relatively higher level difference H, affecting the adhering effect of the sealant 280.

Figure 7:
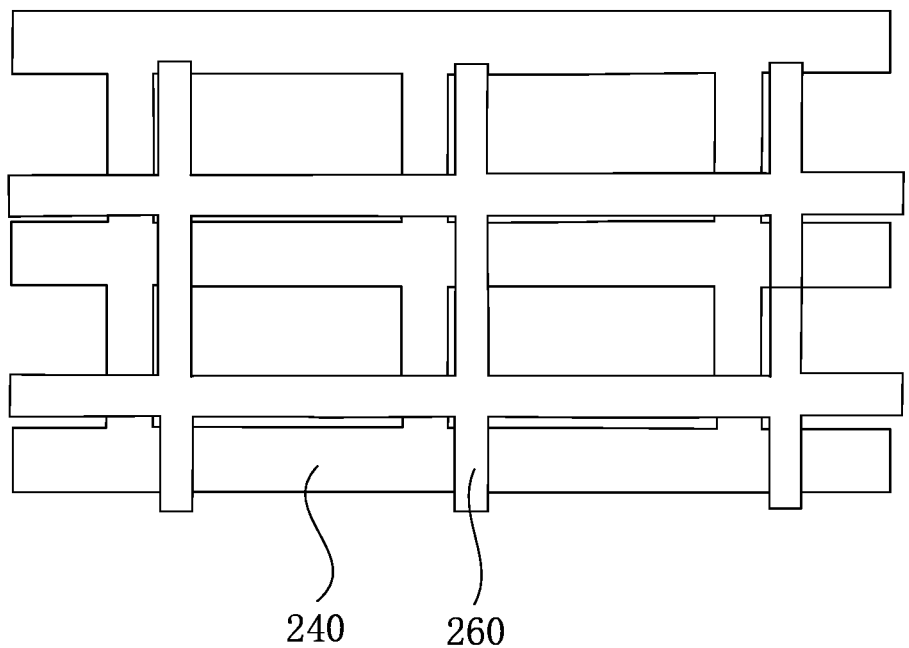
FIG. 7 is a schematic top view of an example first metal layer and second metal layer according to the present application.

As illustrated in FIG. 7, the intervals of the projections of the first metal line 241 and the adjacent second metal lines 261 that are arranged in the same orientation along the direction perpendicular to substrate are 3 microns.

After the sealant 280 is coated, it needs to be cured by ultraviolet light, which is typically irradiated through the side of the array substrate 210. Thus, the ultraviolet light needs to pass through the hollow area formed by every two adjacent first metal line 241 and second metal line 261 that are arranged in the same orientation seen from the direction perpendicular to the substrate, so as to irradiate the sealant 280 to realize the curing of the sealant 280. While ensuring the exposure accuracy, the individual hollow areas formed by the first metal layer 240 and the second metal layer 260 seen from the direction perpendicular to the substrate may be maximized, forming locally larger hollow areas, thus allowing more ultraviolet light to pass through. Accordingly, the sealant 280 disposed in the hollow areas will cure quickly. Furthermore, because there are many such hollowed-out areas and they are distributed in a relatively even manner, the portion of the sealant 280 that is quickly cured sealant may prevent the portion of the sealant 280 that is slowly cured from flowing out, thereby reducing the overall overflow of the sealant 280.

Figure 8:
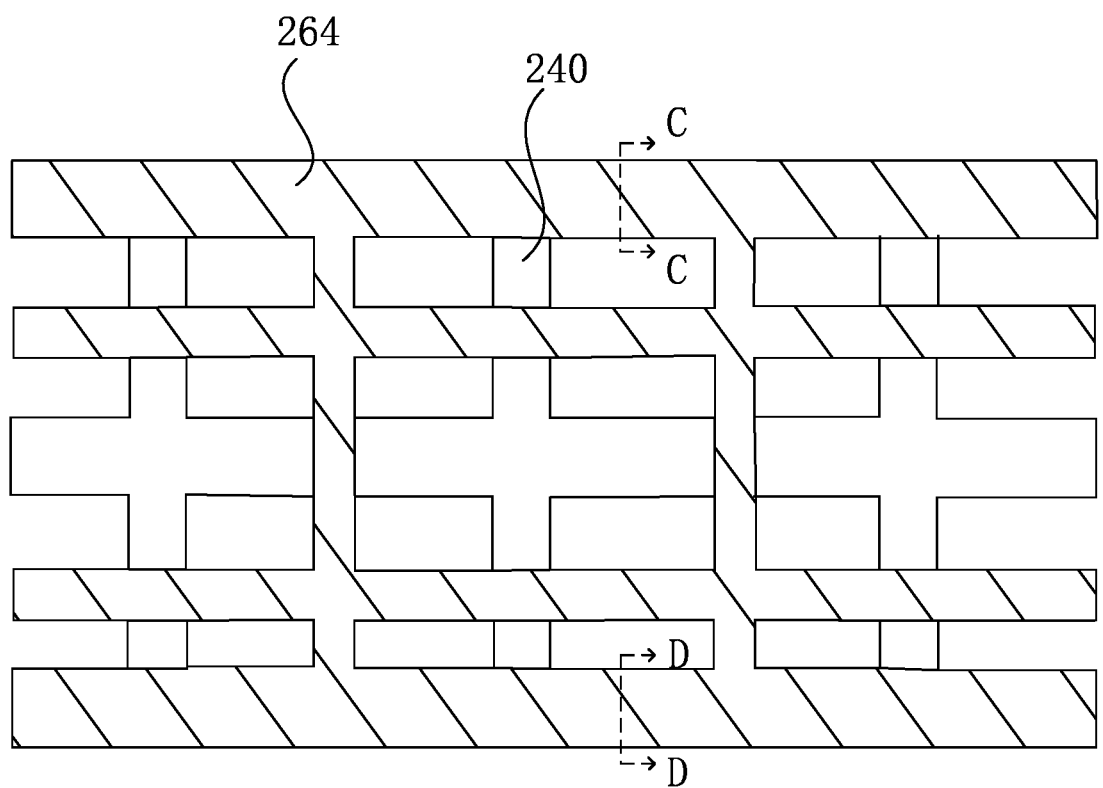
FIG. 8 is a schematic top view of a first metal layer and a second metal layer according to another embodiment of the present application.
Figure 9:
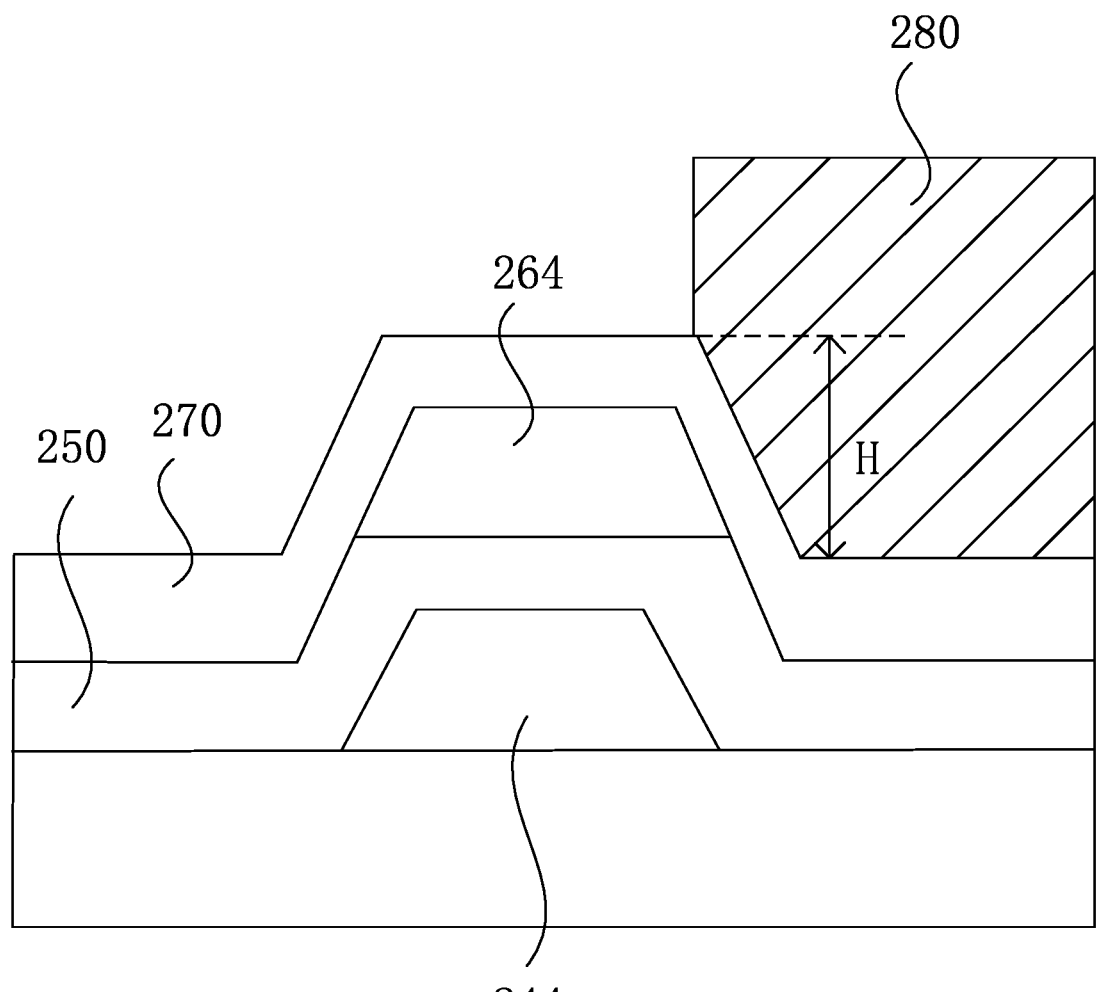
FIG. 9 is a schematic partial cross-sectional view of a first metal layer and a second metal layer taken along line C-C according to yet another embodiment of the present application.
Figures 10, 11:
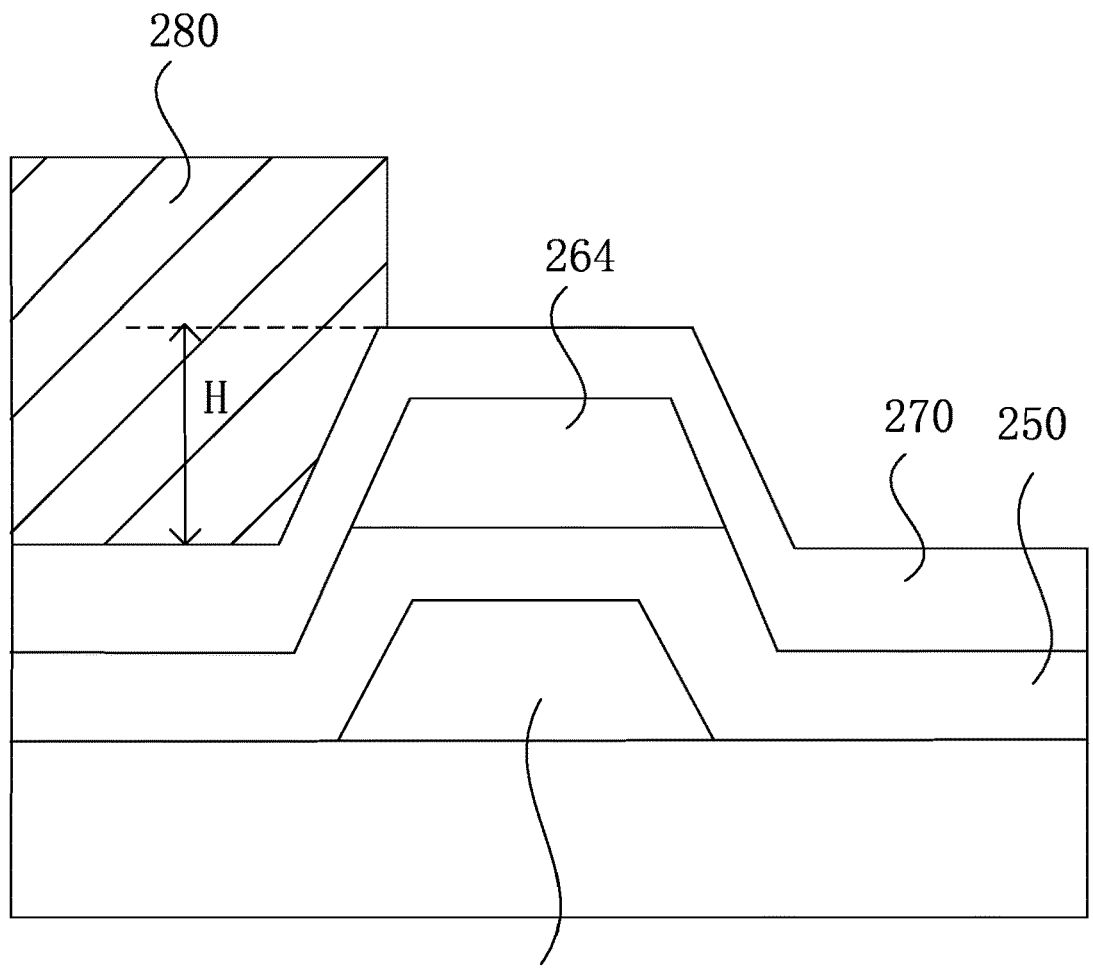
FIG. 10 is a schematic partial cross-sectional view of a first metal layer and a second metal layer taken along line D-D according to still another embodiment of the present application.
FIG. 11 is a schematic diagram of a display device according to an embodiment of the present application.

As illustrated in FIGS. 8 to 10, the second metal layer 260 is disposed on top of the first metal layer 240, and the second metal layer 260 and the first metal layer 240 are locally staggered seen from the direction perpendicular to the substrate. The two sides of the second metal layer 260 overlap the two sides of the first metal layer 240. The first metal layer 240 includes two peripheral first metal lines 244, which are respectively disposed on both sides of the first metal layer 240, and the second metal layer 260 includes two peripheral first metal lines 244, which are respectively disposed on both sides of the second metal layer 260. The projections of the sealant 280 do not overlap the projections of the peripheral first metal lines 244 and the peripheral second metal lines 264 along the direction perpendicular to the substrate. The projections of the peripheral first metal lines 244 coincide with the projections of the peripheral second metal lines 264 along the direction perpendicular to the substrate. The sealant 280 is provided between the two sets of peripheral first metal lines 244.

The orientation of arrangement of the peripheral first metal lines 244 and peripheral second metal lines 264 are consistent with the orientation in which the sealant 280 is coated. The peripheral first metal lines 244 and the peripheral second metal lines 264 are positioned at the edges of the first metal layer 240 and the second metal layer 260. Before curing, the sealant 280 is fluid which has fluidity. During the process of applying the sealant 280, the sealant 280 may have a tendency to diffuse to the periphery. In order to reduce this diffusion tendency, the peripheral first metal lines 244 and the peripheral second metal lines 264 are arranged to overlap seen from the direction perpendicular to the substrate. As such, the height of the overlapped portion would be greater than the other portions, and so the second insulating layer 270 covering the overlapped portion would also have a relatively higher level difference H, which may serve a certain blocking effect on the overflow of the portion of the sealant 280 that has yet been cured.

As illustrated in FIG. 11, as another embodiment of the present application, a display device 100 is disclosed, which includes any display panel of the foregoing embodiments.

The technical solutions of this application may be widely used in various display panels, such as TN (Twisted Nematic) display panels, IPS (In-Plane Switching) display panels, VA (Vertical Alignment) 1) Display panel, MVA (Multi-Domain Vertical Alignment) display panels. Of course, the above solutions may also be applicable to other types of display panels, such as OLED (Organic Light-Emitting Diode) display panels, The foregoing is merely a detailed description of the present application in connection with some specific illustrative implementations, and it is not to be construed as limiting the present application to these implementations. For those having ordinary skill in the technical field to which this application pertains, numerous simple deductions or substitutions may be made without departing from the concept of this application, which shall all be regarded as falling in the scope of protection of this application.

What is claimed is:
1. A display panel, comprising:
   a substrate, comprising a display area and a non-display area that surrounds the display area;
   a first metal layer, disposed on the substrate and located in the non-display area;

a first insulating layer, disposed on the first metal layer and the substrate;

a second metal layer, disposed on the first insulating layer and located in the non-display area;

a second insulating layer, disposed on the second metal layer and the first insulating layer and covering the first metal layer and the second metal layer; and a sealant, disposed on the second insulating layer and corresponding to the first metal layer and the second metal layer;

wherein the first metal layer and the second metal layer are misaligned seen from a direction perpendicular to the substrate;

wherein the first metal layer comprises two sets of peripheral first metal lines, which are respectively arranged on both sides of the first metal layer, and wherein the second metal layer comprises two sets of peripheral second metal lines, which are respectively arranged on both sides of the second metal layer;

wherein a projection of the sealant along the direction perpendicular to the substrate does not overlap projections of the peripheral first metal lines and the peripheral second metal lines onto the substrate along the direction perpendicular to the substrate, wherein projections of the peripheral first metal lines onto the substrate along the direction perpendicular to the substrate coincide with the projections of the peripheral second metal lines onto the substrate along the direction perpendicular to the substrate, and wherein the sealant is disposed between the two sets of the peripheral first metal lines.

2. The display panel of claim 1; wherein the first metal layer comprises a plurality of first metal lines; and the second metal layer comprises a plurality of second metal lines, wherein projections of the first metal line and the second metal line that are arranged in parallel onto the substrate along the direction perpendicular to the substrate do not overlap, wherein a projection of the sealant along the direction perpendicular to the substrate at least partially overlaps projections of the first metal lines and the second metal lines along the direction perpendicular to the substrate.

3. The display panel of claim 1, further comprising a plurality of first driving circuits configured to drive scan lines arranged in the display area, and a plurality of second driving circuits configured to drive data lines arranged in the display area;

wherein the first metal layer and the second metal layer are configured to couple two adjacent first driving circuits and further couple the first driving circuits to a timing controller, or configured to couple two adjacent second driving circuits.

4. The display panel of claim 1, wherein an upper surface of at least a part of the second insulating layer located on the first metal layer has a same height as that of an upper surface of at least a part of the second insulating layer located on the second metal layer.

5. The display panel of claim 2, wherein the plurality of first metal lines comprises a plurality of first metal first lines and a plurality of first metal second lines, and the plurality of second metal lines comprises a plurality of second metal first lines and a plurality of second metal second lines, and wherein the plurality of first metal first lines are arranged in parallel with the plurality of second metal first lines, the plurality of first metal second lines are arranged in parallel with the plurality of second metal second lines, and wherein the plurality of first metal first lines are not arranged in parallel with the plurality of first metal second lines.

6. The display panel of claim 2, wherein an interval between projections of the first metal line and adjacent second metal lines that are arranged in parallel onto the substrate along the direction perpendicular to the substrate is greater than or equal to 3 microns.

7. The display panel of claim 2, wherein projections of the first metal line and two adjacent second metal lines that are arranged in parallel onto the substrate along the direction perpendicular to the substrate are positioned at equal intervals.

8. The display panel of claim 2, wherein intervals of projections of the first metal line and adjacent second metal lines that are arranged in parallel onto the substrate along the direction perpendicular to the substrate are nonzero.

9. The display panel of claim 1, wherein the display panel comprises an array substrate and a color filter substrate, which are oppositely arranged, wherein the first metal layer and the second metal layer are disposed on the array substrate.

10. The display panel of claim 9, wherein the sealant is disposed on the plurality of first metal lines and the plurality of second metal lines, and is arranged to surround the display area and seal edges of the array substrate and the color filter substrate.

11. The display panel of claim 1, wherein a material of the sealant is prepared by epoxy resin, a curing agent, a filler, and an additive.

12. A display panel, comprising:
a substrate, comprising a display area and a non-display area that surrounds the display area;
a first metal layer, disposed on the substrate and located in the non-display area;
a first insulating layer, disposed on the first metal layer and the substrate;
a second metal layer, disposed on the first insulating layer and located in the non-display area;
a second insulating layer, disposed on the second metal layer and the first insulating layer and covering the first metal layer and the second metal layer;
a sealant, disposed on the second insulating layer;
a plurality of first driving circuits, configured to drive scan lines arranged in the display area; and
a plurality of second driving circuits, configured to drive data lines arranged in the display area;
wherein the first metal layer and the second metal layer are arranged in a same orientation, and are configured to couple together two adjacent first driving circuits or two adjacent second driving circuits, wherein the first metal layer comprises a plurality of first metal lines, the second metal layer comprises a plurality of second metal lines, wherein projections of the first metal line and the second metal line that are arranged in parallel onto the substrate along a direction perpendicular to the substrate do not overlap, and projections of every two adjacent first metal line and second metal line that are arranged in parallel onto the substrate along the direction perpendicular to the substrate are positioned at equal intervals, and wherein a projection of the sealant along the direction perpendicular to the substrate at least partially overlaps the projections of the first metal lines and the second metal lines along the direction perpendicular to the substrate;
the plurality of first metal lines comprises a plurality of first metal first lines and a plurality of first metal second lines, the plurality of second metal lines comprises a plurality of second metal first lines and a plurality of second metal second lines, wherein the plurality of first metal first lines are arranged in parallel with the plurality of second metal first lines, the plurality of first metal second lines are arranged in a parallel with the plurality of second metal second lines, and the plurality of first metal first lines are not arranged in parallel with as the plurality of first metal second lines; wherein the projections of the plurality of first metal first lines along the direction perpendicular to the substrate do not overlap the projections of the plurality of second metal first lines along the direction perpendicular to the substrate, the projections of the plurality of first metal second lines along the direction perpendicular to the substrate do not overlap the projections of the plurality of second metal second lines along the direction perpendicular to the substrate, the plurality of first metal first lines are arranged perpendicular to the plurality of first metal second lines seen from the direction perpendicular to the substrate, and the plurality of second metal first lines are arranged perpendicular to the plurality of second metal second lines seen from the direction perpendicular to the substrate; wherein an upper surface of at least a part of the second insulating layer located on the first metal layer has a same height as that of an upper surface of at least a part of the second insulating layer located on the second metal layer.

13. A display device, comprising a display panel, the display panel comprising:
   a substrate, comprising a display area and a non-display area that surrounds the display area;
   a first metal layer, disposed on the substrate and located in the non-display area;
   a first insulating layer, disposed on the first metal layer and the substrate;
   a second metal layer, disposed on the first insulating layer and located in the non-display area;
   a second insulating layer, disposed on the second metal layer and the first insulating layer and covering the first metal layer and the second metal layer; and
   a sealant, disposed on the second insulating layer and corresponding to the first metal layer and the second metal layer;
   wherein the first metal layer and the second metal layer are misaligned seen from a direction perpendicular to the substrate;
   wherein the first metal layer comprises two sets of peripheral first metal lines, which are respectively arranged on both sides of the first metal layer, and wherein the second metal layer comprises two sets of peripheral second metal lines, which are respectively arranged on both sides of the second metal layer;
   wherein a projection of the sealant along the direction perpendicular to the substrate does not overlap projections of the peripheral first metal lines and the peripheral second metal lines onto the substrate along the direction perpendicular to the substrate, wherein projections of the peripheral first metal lines onto the substrate along the direction perpendicular to the substrate coincide with the projections of the peripheral second metal lines onto the substrate along the direction perpendicular to the substrate and wherein the sealant is disposed between the two sets of the peripheral first metal lines.

14. The display device of claim 13, wherein the first metal layer comprises a plurality of first metal lines, and the second metal layer comprises a plurality of second metal lines, wherein projections of the first metal line and the second metal line that are arranged in parallel onto the substrate along the direction perpendicular to the substrate do not overlap, wherein a projection of the sealant along the direction perpendicular to the substrate at least partially overlaps projections of the plurality of first metal lines and the plurality of second metal lines along the direction perpendicular to the substrate.

15. The display device of claim 14, wherein the plurality of first metal lines comprises a plurality of first metal first lines and a plurality of first metal second lines, and the plurality of second metal lines comprises a plurality of second metal first lines and a plurality of second metal second lines, and wherein the plurality of first metal first lines are arranged in parallel with the plurality of second metal first lines, the plurality of first metal second lines are arranged in parallel with the plurality of second metal second lines, and wherein the plurality of first metal first lines are not arranged in parallel with the plurality of first metal second lines.

* * * * *